United States Patent
Shelke et al.

(10) Patent No.: US 11,336,701 B2
(45) Date of Patent: May 17, 2022

(54) CREATION AND SHARING OF CONTACTS GROUPS BETWEEN COMMUNICATION PARTICIPANTS

(71) Applicant: Avaya Inc., Basking Ridge, NJ (US)

(72) Inventors: Sudhir Shelke, Pune (IN); Amol Navale, Pune (IN); Aonkar Takalikar, Pune (IN)

(73) Assignee: Avaya Inc., Basking Ridge, NJ (US)

( * ) Notice: Subject to any disclaimer, the term of this patent is extended or adjusted under 35 U.S.C. 154(b) by 31 days.

(21) Appl. No.: 16/524,815

(22) Filed: Jul. 29, 2019

(65) Prior Publication Data

US 2021/0037068 A1 Feb. 4, 2021

(51) Int. Cl.
*H04L 65/1096* (2022.01)
*H04L 65/403* (2022.01)
*H04L 65/1093* (2022.01)

(52) U.S. Cl.
CPC ...... *H04L 65/1096* (2013.01); *H04L 65/1093* (2013.01); *H04L 65/403* (2013.01)

(58) Field of Classification Search
CPC .............................. H04L 67/306; G06Q 50/01
See application file for complete search history.

(56) References Cited

U.S. PATENT DOCUMENTS

| | | | |
|---|---|---|---|
| 7,916,976 B1* | 3/2011 | Kedikian | G06F 16/22 382/305 |
| 2005/0062844 A1* | 3/2005 | Ferren | H04N 7/142 348/14.08 |
| 2005/0125541 A1* | 6/2005 | Frank | H04L 69/329 709/227 |
| 2010/0240394 A1* | 9/2010 | Yamada | H04M 1/2757 455/456.1 |
| 2011/0271197 A1* | 11/2011 | Jones | H04L 12/1822 715/739 |
| 2014/0111597 A1* | 4/2014 | Anderson | H04L 65/1073 348/14.03 |

* cited by examiner

*Primary Examiner* — Glenford J Madamba

(57) ABSTRACT

The technology disclosed herein enables the creation of a contacts group from participants in a communication session along with the ability to share that created contacts group. In a particular embodiment, a method includes identifying participants participating in a communication session and receiving first user input from a first participant of the participants. The first user input identifies a first selection of the participants comprising at least one of the participants. The method further includes obtaining first contact information for the first selection of the participants and including the first contact information in a first contacts group. The method also includes providing the first contacts group to a selection of one or more users.

20 Claims, 9 Drawing Sheets

CREATION AND SHARING OF CONTACTS GROUPS BETWEEN COMMUNICATION PARTICIPANTS

TECHNICAL BACKGROUND

Many types of user communication systems are capable of maintaining contact information for people or entities (e.g., a business) with which their users may wish to communicate, or otherwise wish to save. The contact information may include information needed to contact a person or entity via one or more modes (e.g., phone, email, messaging, etc.), including multiple items of contact information for the same mode (e.g., work phone, mobile phone, home phone, etc.). In many cases, the contact information may be used to assist the user when establishing a communication. For instance, a user may select an item of contact information to initiate a communication or the contact information may be used to autofill an item of contact information. Contact information may be stored locally on a user communication system, may be accessible by the user communication system from a remote contact information storage system, may be synchronized with other user communication systems locally or through a remote contact information storage system, or may be maintained in some other manner which allows a user to access the contact information via the user communication system. Some applications for accessing contact information may allow a user to organize contact information for various people/entities into groups, which can benefit the user when trying to find a particular item of contact information.

SUMMARY

The technology disclosed herein enables the creation of a contacts group from participants in a communication session along with the ability to share that created contacts group. In a particular embodiment, a method includes identifying participants participating in a communication session and receiving first user input from a first participant of the participants. The first user input identifies a first selection of the participants comprising at least one of the participants. The method further includes obtaining first contact information for the first selection of the participants and including the first contact information in a first contacts group. The method also includes providing the first contacts group to a selection of one or more users.

In some embodiments, after providing the first contacts group, the method includes receiving second user input, wherein the second user input identifies a second selection of the participants comprising at least one of the participants not already included in the first contacts group, obtaining second contact information for the second selection of the participants, and updating the first contacts group with the second contact information.

In some embodiments, receiving the first user input includes displaying a list of the participants to the first participant and receiving the first selection of the participants from the list of the participants.

In some embodiments, receiving the first user input includes receiving one or more criterion for including a participant in the first contacts group and determining that each participant of the first selection of the participants satisfies the one or more criterion. In those embodiments, the one or more criterion may include a characteristic related to employment of a participant.

In some embodiments, the method further provides receiving second user input, wherein the second user input indicates one or more criterion for when first contacts group will expire, and including the one or more criterion when providing the first contacts group. In those embodiments, upon satisfaction of the one or more criterion, the first contacts group may be removed from a contacts list for each respective user of the selection of one or more users.

In some embodiments, providing the first contacts group includes providing an instruction to a contact information storage system to share the first contacts group with each user of the selection of one or more users, wherein the contact information storage system includes the first contacts group in a contacts list for each respective user of the selection of one or more users that has a contacts list stored in the contact information storage system. In those embodiments, the contact information storage system may provide a link to access the first contacts group to respective users of the one or more users that do not have a contacts list in the contact information storage system.

In another embodiment, an apparatus is provided including one or more computer readable storage media and a processing system operatively coupled with the one or more computer readable storage media. Program instructions stored on the one or more computer readable storage media, when read and executed by the processing system, direct the processing system to identify participants participating in a communication session and receive first user input from a first participant of the participants. The first user input identifies a first selection of the participants comprising at least one of the participants. The program instructions further direct the processing system to obtain first contact information for the first selection of the participants and include the first contact information in a first contacts group. The program instructions also direct the processing system to provide the first contacts group to a selection of one or more users.

DETAILED DESCRIPTION

As noted above, organizing contact information into groups can make it easier to find particular items of contact information maintained on behalf of a user, which will be referred to herein as the user's contacts list although data structures other than lists may be used for maintaining contact information. For example, a user may create a group in their contacts list including the contact information for all people representing the user's company at an upcoming sales conference. Should the user need to contact one or more people in that group, the user can look in the group when accessing their contacts list. In the aforementioned example, the user manually organized the contact information into a group and used it for their own benefit. However, it is likely that other people would also benefit from having such a group in their own contacts lists.

The examples described below enable the creation of contacts groups from participants on a communication and enable the ability to share those contacts groups among the other participants whose contact information was included in the groups. Continuing the sales conference example from above, an initial conference call may be had among the people that will be representing the company at the sales conference. One participant on the call may instruct their user communication system to create a group of contact information for each of the participants on the call and share the group with other users, which may include the other participants. Each of the users that were provided with the group can then access the group in their own contacts lists to find contact information for the selected participants without having to manually create a contacts group themselves.

Figure 1:
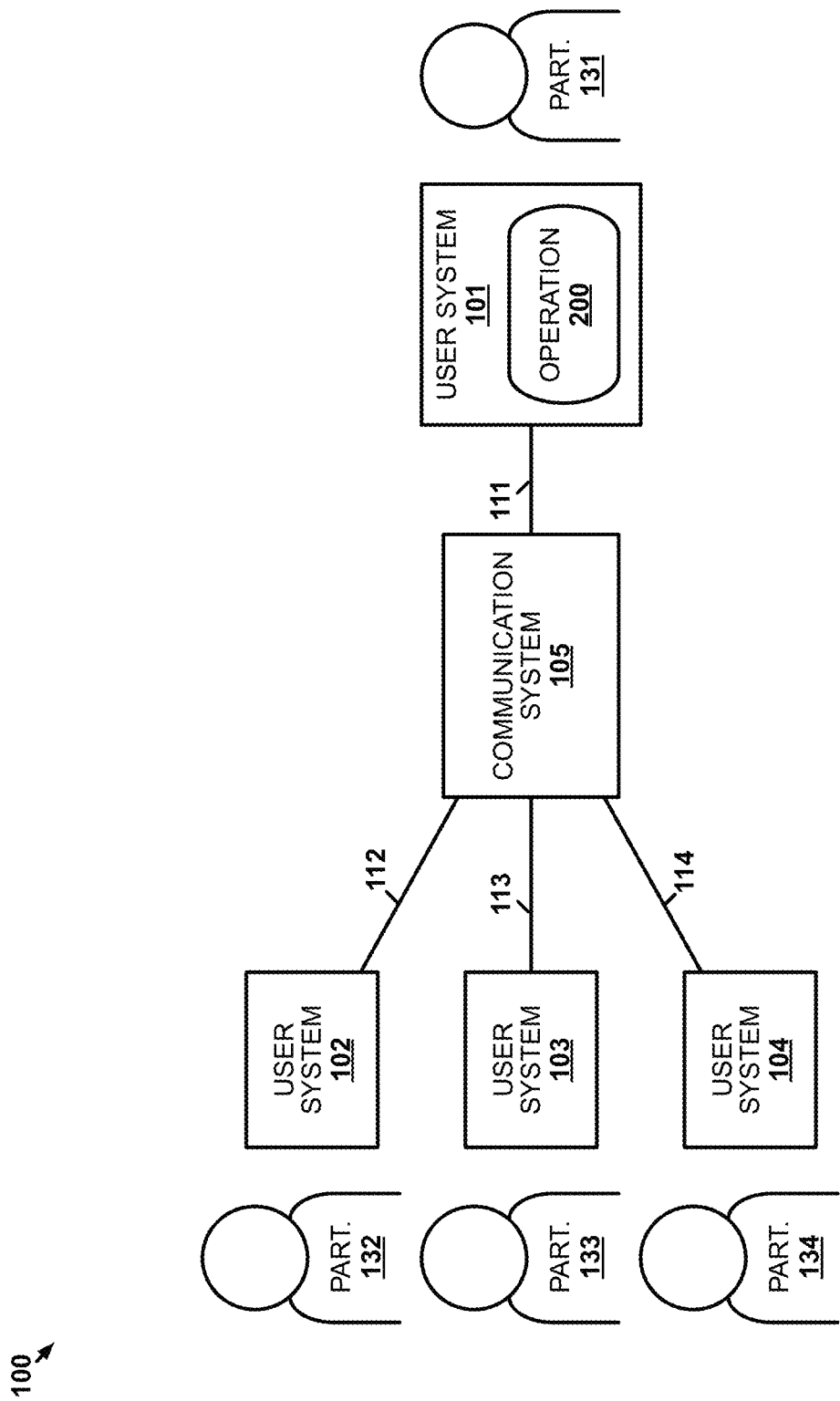
FIG. 1 illustrates an implementation for creating and sharing contacts groups between communication participants.

FIG. 1 illustrates implementation 100 for creating and sharing contacts groups between communication participants. Implementation 100 includes user system 101, user system 102, user system 103, user system 104, and communication system 105. User system 101 and communication system 105 communicate over communication link 111. User system 102 and communication system 105 communicated over communication link 112. User system 103 and communication system 105 communicate over communication link 113. User system 104 and communication system 105 communicate over communication link 114. Communication link 111, communication link 112, communication link 113, and communication link 114 may be direct links or may include intervening systems, networks, or devices.

In operation, communication system 105 facilitates communication sessions between two or more endpoints to exchange user communications on behalf of users at the respective endpoints. Other implementations may not require communication system 105 and the two or more endpoints may communicate on a peer-to-peer basis in those examples. In this case, the endpoints are user system 101, user system 102, user system 103, and user system 104, which are user communication systems operated by participant 131, participant 132, participant 133, and participant 134, respectively. Each of user system 101, user system 102, user system 103, and user system 104 may be a desktop phone, mobile phone, computer workstation, laptop, conference room system, or some other type of computing system capable of participating in a communication session—including combinations thereof. Implementation 100 shows only one participant per user system but, it should be understood, other examples may include multiple participants at one or more of the user systems. For example, multiple participants may join a communication session using a conference room system.

During a communication session between user system 101, user system 102, user system 103, and user system 104, user system 101 performs operation 200 to create and share a contacts group containing contact information for a selection of participant 131, participant 132, participant 133, and participant 134. It should be understood that a different user system may perform operation 200 in other examples.

Figure 2:
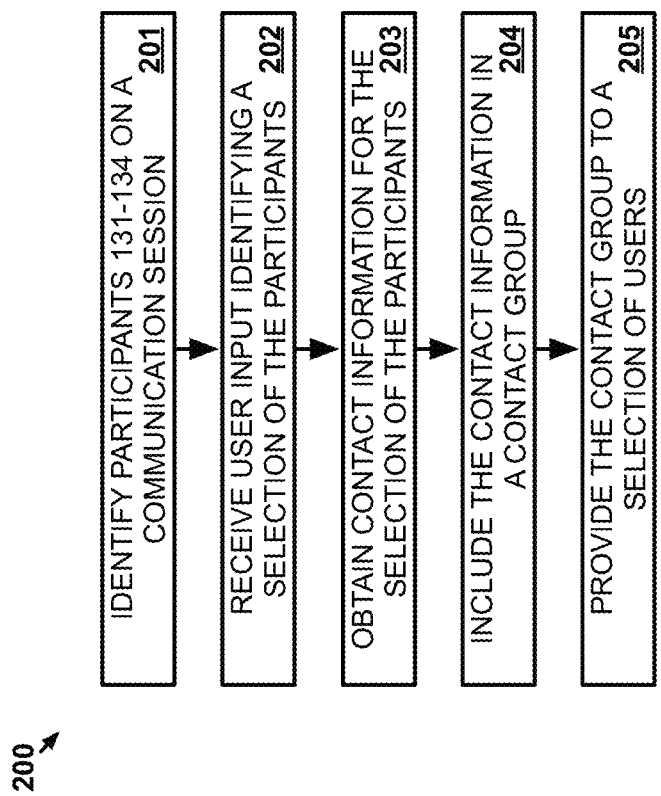
FIG. 2 illustrates an operation for creating and sharing contacts groups between communication participants.

FIG. 2 illustrates operation 200 for creating and sharing contacts groups between communication participants. In operation 200, user system 101 identifies participants participating in a communication session between user system 101, user system 102, user system 103, and user system 104 (201). The communication session may be a voice communication, video communication, text chat communication, or some other type of session for exchanging user communications between participants—including combinations thereof. User system 101 may identify participants independently or may coordinate with communication system 105. In one example, user system 101 may execute a client application to communicate on the communication session and perform operation 200. That client application may include an interface that receives information from communication system 105 about who is participating in the communication session. The client example may be a native application executing on user system 101 or a non-native application, such as a web-based interface executing in a browser window.

In this example, participant 131, participant 132, participant 133, and participant 134 are identified as the participants in the communication session. The participants may identify themselves for the communication session from login information provided by the participants into their respective user systems, such as a username/password for a particular participant entered into a client executing on a user system or a code for the participant entered via a number pad depending on the type and capabilities of the user system. The login information may also be used to authenticate the respective participants to communication system 105 and may be provided in order to join the communication session. In other examples where two or more participants are participating in the communication session via a single user system, each of the participants may manually identify themselves via the user system or the user system may automatically identify the participants, such as through image or voice recognition processing. In one example, if a participant dials in to the communication session using a standard telephone call, communication system 105 may determine a participant associated with the originating phone number of the call. Alternatively, the phone number (or other identifier, such as user handle) may be used as a stand in for the participant's name should identification of their name not be possible. Other manners of identifying participants may also be used.

During the communication session, user system 101 receives user input from participant 131 that identifies a selection of the participants (202). The selection is of one or more of participant 131, participant 132, participant 133, and participant 134 that participant 131 wishes to include in a contacts group. User system 101 may present (e.g., display or audibly represent) that participant 131, participant 132, participant 133, and participant 134 are the participants on the communication that are available for selection and provide a mode for accepting the selection (e.g., checkbox next to a visual indicator for each participant). In one example, the client application for the communication session on user system 101 presents the participants on the communication session to participant 131 and provides input options to participant 131 to select ones of the participants. In another example, a different application, such as a contact information application, may communicate with the client application for the communication session, or communication system 105 directly, to present and accept input selecting the participants. Other manners of performing selections may also be used.

In some examples, participant 131 may provide one or more criterion to user system 101 to allow user system 101 to automatically select participants. For instance, the one or more criterion may include employment related characteristics such as a job title, workgroup, skillset, seniority, or some other characteristic that a person may have with respect to their employment. Other characteristics that describe a person may also be used in the one or more criterion. The one or more criterion may require a participant to have or not have a particular characteristic or combination of characteristics for user system 101 to select that participant. For example, participant 131 may define that all participants at a director level or above should be selected. In some cases, user system 101 may need to reference another system to determine whether the one or more criterion is satisfied by a given participant. For instance, an employment record database may need to be referenced to determine whether a participant is director level or above in the preceding example.

After receiving a selection of the participants, user system 101 obtains contact information for each participant in the selection (203). The contact information may already be stored on user system 101 or may need to be retrieved from another system, such as communication system 105 or a separate contact information storage system. Participant 131 may have contact information for participant 132, participant 133, and participant 134 already stored participant 131's own contacts list that participant 131 accesses via user system 101 or another user system associated with participant 131 should that contacts list sync or otherwise be accessible across multiple user systems. If the contact information for any of the participants is not stored on user system 101 and/or a contacts list of participant 131, then user system 101 may retrieve contact information from elsewhere, such as an employee record system if the participant is an employee. Alternatively, user system 101 may transfer a query to the user system of a participant with missing contact information to request that participant's contact information. Similarly, participant 131 may be able to provide contact information for a particular participant manually if contact information is not otherwise available. In some examples, obtaining the contact information may include user system 101 instructing a remote contact information storage system to obtain the contact information. In some examples, rather than obtaining contact information for all modes of communication (and/or all different items of contact information within a mode) with a particular participant (e.g., work email, mobile phone, work phone, fax, messaging service handle, etc.) only certain modes may be obtained. For example, even if participant 131 has access to participant 132's home phone number and email address, only participant 132's work phone number and email address may be obtained for inclusion in the contacts group below. Participant 131 may provide user input to manually define which items of contact information should be included in the contacts group.

Once the contact information is obtained, user system 101 includes the contact information in a contacts group (204). To include the obtained contact information in a contacts group, user system 101 may create the contacts group and populate the contacts group with the contact information for each of the selected participants. The contacts group may be created locally on user system 101 or user system 101 may instruct a remote contact information storage system to create the contacts group. Even when created locally at user system 101, the contacts group may synchronize with a remote contact information storage system. The creation of the contacts group may depend on the procedures, protocols, etc. defined by a service used to store contact information on behalf of participant 131 in a remote contact information storage system. In some examples, the contacts group may be created in participant 131's contacts list or may be created outside of participant 131's contacts list and participant 131 may then have the option of providing the contacts list to themselves in step 205 below.

After creating the contacts group, user system 101 provides the contacts group to a selection of one or more users (205). The one or more users may be the selection of participants so that once the contacts group is provided each participant will have the contact information of the other selected participants. Alternatively, user system 101 may receive additional input from participant 131 defining to who the contacts group should be provided. Participant 131 may select from only participant 132, participant 133, and participant 134 or may be allowed to select other users not participating in the communication session. If one or more of the selected users uses the same contact information storage system (e.g., a contacts list service provided by the system) as participant 131 to maintain contacts lists on their behalf, then a share function provided by that service/system may be used. In those cases, user system 101 may simply instruct the contact information storage system to share the contacts group with the selected users. Upon receiving the instruction, the contact information storage system populates the contacts group into the selected users' contacts lists. In some cases, the contact information storage system may be capable of exchanging contacts group information with different types of contact information storage systems. In those cases, the contacts group may be reformatted into a format used by the receiving contact information storage system before transfer or the receiving contact information storage system may be relied upon to perform its own reformatting.

For users of the selected users that do not use the same contact information storage system as participant 131, other manners of sharing the contacts group may be used. For example, the contacts group may be formatted in a non-proprietary format, such as comma separated value (CSV) file, vCard file, or URL link to access the contacts group on a contact information storage system, and transferred to users via a more widely used messaging format, such as email, text message, etc. either as a group or individually depending on the capabilities of the format and the receiving user system. The contacts group may be transferred directly from user system 101 or may be transferred by another system, such as a contact information storage system discussed above. In some examples, the communication session itself may be used to transfer the contacts group to when one or more of participant 132, participant 133, and participant 134 are selected to receive the contacts group.

In some examples, operation 200 may repeat for the same communication so that participant 131 or another participant in the communication session can create one or more additional contacts groups. For example, the communication session may be between participants handling a particular project and one contacts group may be created to include participants involved in one part of the project while a second contacts group is created to include participants involved in another part of the project.

In some examples, updates to a created contacts group may also be enabled. Participant 131 may add or remove participants from the contacts group and those changes may propagate automatically to the instances of the contacts group shared with ones of the selected users that had the contacts group shared via the contact information storage system. Alternatively, the updates may be transferred over the standard messaging format. Only the updates may be transferred, or the entire group may be transferred allowing the receiving user to simply replace the old version of the contacts group with the new version.

In further examples, participant 131 may provide one or more criterion for when the contacts group will expire. For instance, the one or more criterion may be time based, such as a future day/time or an amount of time since creation of the contacts group, or may be based on the occurrence of some event, such as completion of a project that the participants in the contacts group were a part of. The one or more criterion may be included in metadata of the contacts group when provided to the selected users or may be associated with the contacts group in some other way. A user system or a contact information storage system reads the one or more criterion and allows the group to expire upon satisfaction thereof. Allowing the contacts group to expire may comprise removing the contacts group from the respective contacts lists of the selected users that were provided with the contacts group. In some cases, the contact information included in the contacts group may be deleted from the contacts lists while other examples may allow the contact information to remain in the contacts lists even though the contact information is no longer grouped in the contacts group. In yet other examples, expiration of the contacts group may trigger the user systems of the selected users to query their respective user about whether the user desires the contacts group to be removed/deleted. Each user in those examples therefore has the option about whether they want to keep the contacts group rather than the contacts group being automatically deleted.

Figure 3:
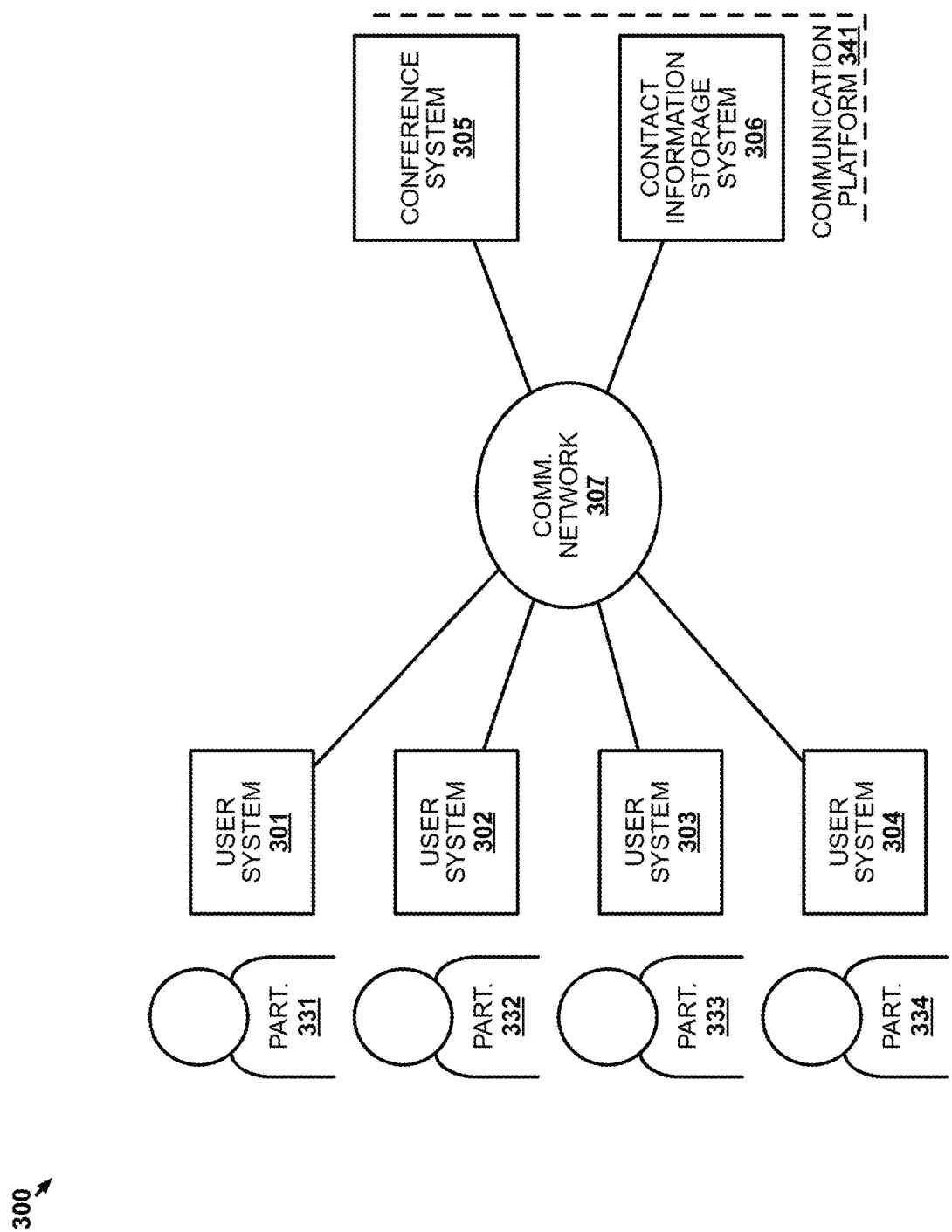
FIG. 3 illustrates another implementation for creating and sharing contacts groups between communication participants.

FIG. 3 illustrates implementation 300 for creating and sharing contacts groups between communication participants. Implementation 300 includes user system 301, user system 302, user system 303, user system 304, conference system 305, contact information storage system 306, and communication network 307. Communication network 307 may include one or more local area networks and/or wide area computing networks, including the Internet, over which the systems in implementation 300 communicate. While shown separately, conference system 305 and contact information storage system 306 may be combined into a single device. Likewise, conference system 305 and contact information storage system 306 may each be distributed across multiple devices.

In operation, conference system 305 and contact information storage system 306 are part of communication platform 341. Communication platform 341 in this case provides both communication session services, via conference system 305, and contacts list storage/synchronization services, via contact information storage system 306, to user systems having access to communication platform 341. For example, employees of a company having communication platform 341 may be provided with access, via one or more of their respective user systems, to the services of communication platform 341. In other examples, communication platform 341 may be configured to provide services for anyone who subscribes to those services regardless of whether they are associated with a particular company/organization. In the examples below, at least one of participant 331, participant 332, participant 333, and participant 334 have access to the services of communication platform 341 to establish communication sessions with other users, possibly with users that would not otherwise have access to conference system 305's communication services. Similarly, those who have access to the services of communication platform 341 also have the ability to store, sync, and otherwise have their contact lists maintained by contact information storage system 306.

Figure 4:
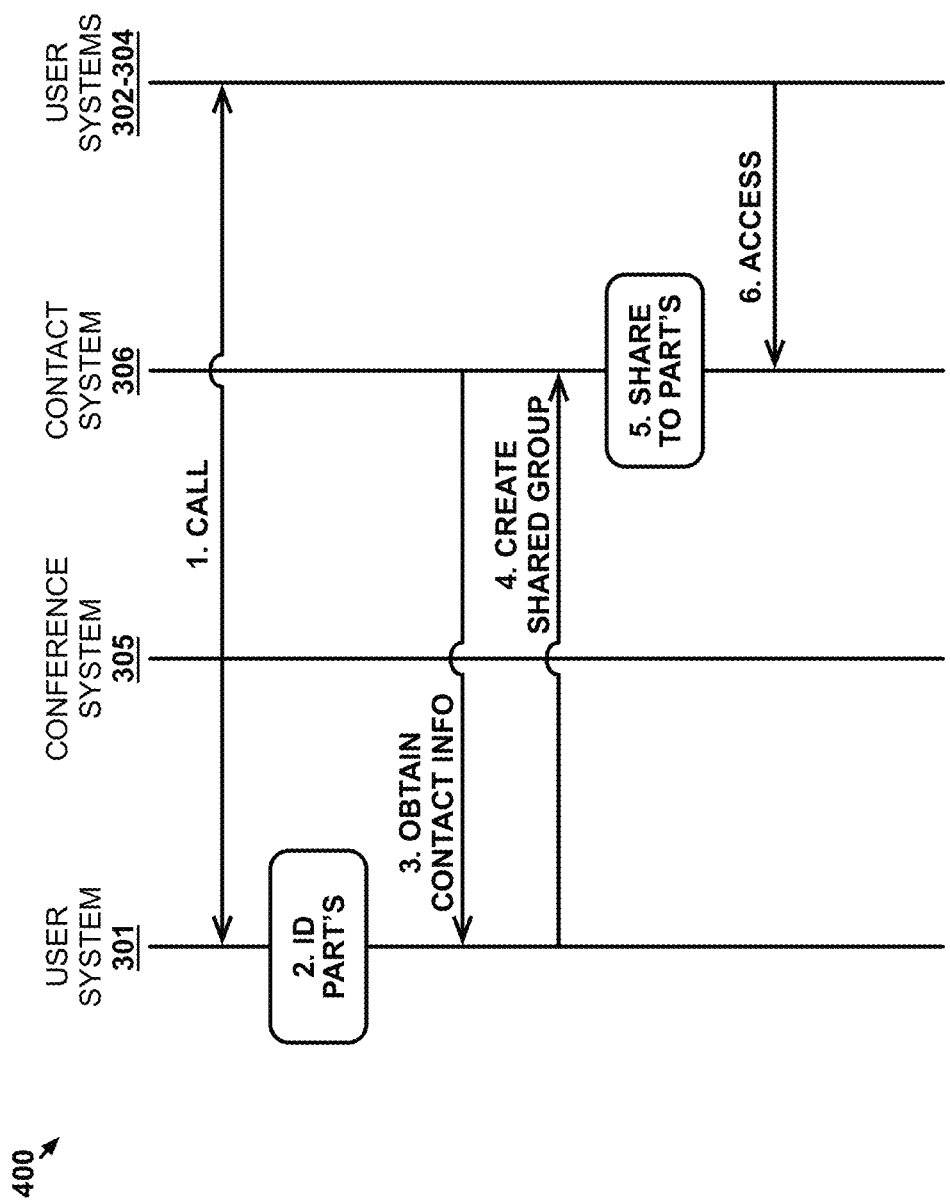
FIG. 4 illustrates an operational scenario for creating and sharing contacts groups between communication participants.

FIG. 4 illustrates operational scenario 400 for creating and sharing contacts groups between communication participants. In operational scenario 400, conference system 305 facilitates a conference call communication session at step 1 between user system 301, user system 302, user system 303, and user system 304 so that participant 331, participant 332, participant 333, and participant 334 can exchange user communications with one another. The conference call may be a voice only call, a video call, or some combination thereof. In some examples, additional side communications, such as text or files, may be exchanged as well.

During the call, participant 331 provides user input at step 2 into user system 301 indicating participants on the call that should be included in a contacts group at step 2. The user input may be provided via a conference client application that is executing on user system 301 for the conference call or may be input via a different application on user system 301. For example, a contacts list application may execute on user system 301 for participant 331 to access their contacts list that syncs with conference system 305. The contacts list application may be aware of the participants currently participating on a call such that participant 331 can provide user input via the contacts application (e.g., the contacts list application may communicate with the conference client application or with communication platform 341 to retrieve the participants). In some examples, the conference client application and the contacts application may be combined into a unified application.

In this example, participant 331 selected all of the participants on the conference call, including participant 331, to include in the contacts group. Thus, user system 301 obtains contact information of participant 332, participant 333, and participant 334 from contact information storage system 306 if user system 301 did not already have contact information for those participants stored locally. This example presumes that user system 301 already has contact information for participant 331 since user system 301 is being operated by participant 331, although user system 301 may also need to obtain contact information for participant 331 in other examples. In some examples, user system 301 may instruct contact information storage system 306 to gather contact information for the selected participants. In those examples, user system 301 may simply provide an interface to participant 331 showing that contact information storage system 306 is creating a contacts group and populating that contacts group with contacts information (which may end up being synced with user system 301) rather than user system 301 performing the steps locally. The contact information may be available in participant 331's contacts list (whether stored at user system 301 or contact information storage system 306) or may need to be retrieved by contact information storage system 306 from elsewhere (e.g., a system storing an employee records database).

User system 301 further instructs contact information storage system 306 at step 4 to create a shared contacts group with the obtained contacts information. The contacts group itself may be created at step 6 or the contacts group may have already been created by user system 301 with the obtained contacts information and user system 301 indicates that the contacts group should be shared at step 6. In the latter example, participant 331 may have instructed user system 301 to create a contacts group with the contact information of all participants (e.g., for use in participant 331's own contacts list) and then selected an option provided by user system 301 to share the contacts group with other users. In this example, participant 331 indicates that the contacts group should be shared between all the participants in the contacts group. Although, in other examples, participant 331 may indicate users other than those participating on the conference call.

Once contact information storage system 306 is notified that the contacts group should be shared, contact information storage system 306 shares the contacts group at step 5 with the contacts lists of participant 332, participant 333, and participant 334. In this example, participant 331, participant 332, participant 333, and participant 334 all are allowed to access services provided by communication platform 341 (e.g., the participants may all be employees of the same company). As such, contact information storage system 306 can use its own sharing procedures to ensure that the contacts group appears in the contacts lists of each of participant 331, participant 332, participant 333, and participant 334. When any of participant 331, participant 332, participant 333, and participant 334 goes to access their respective contacts lists at step 6 via user system 301, user system 302, user system 303, and user system 304, the contacts group and the contact information therein will appear. Thus, upon completion of operational scenario 400 user system 301 has successfully shared contact information among the conference call's participants in a grouping associated with the conference call.

Figure 5:
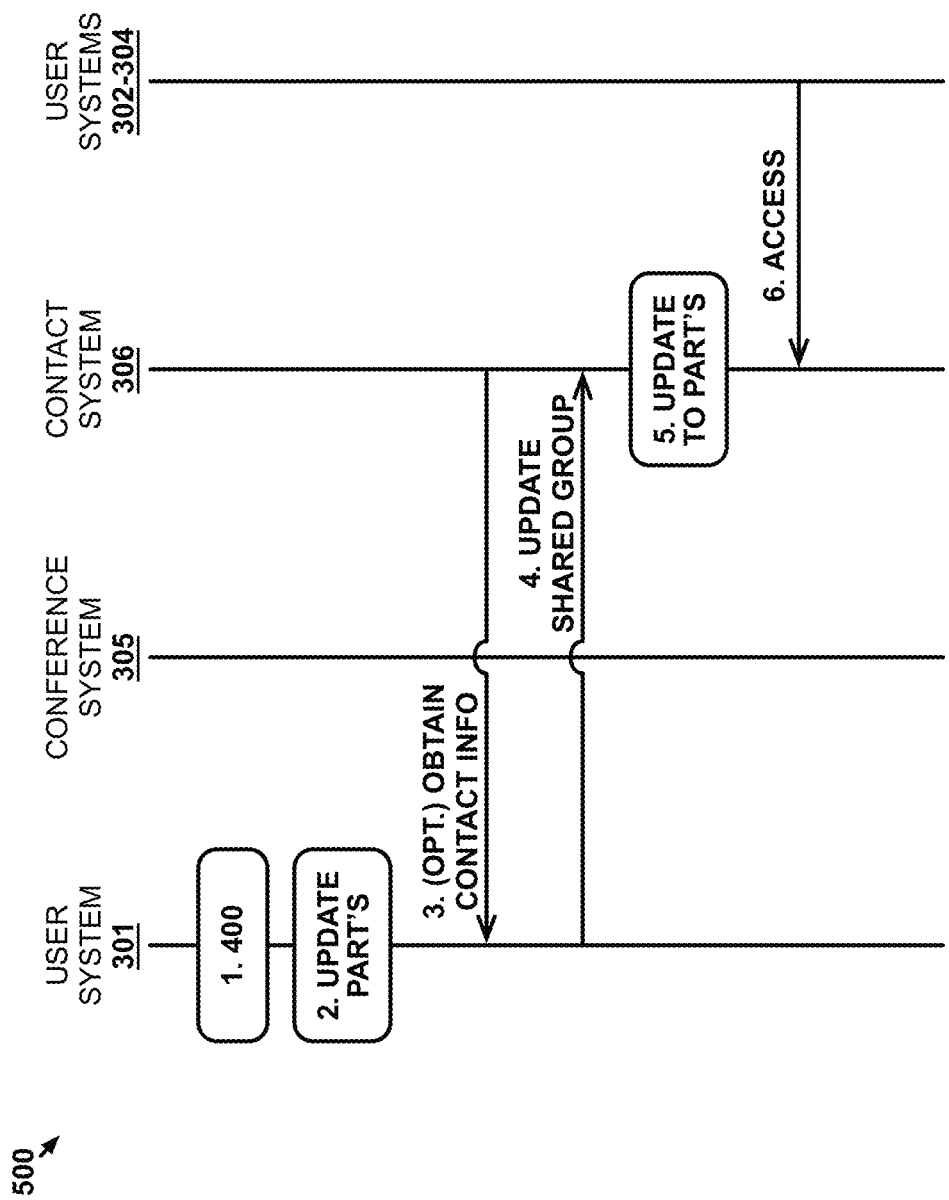
FIG. 5 illustrates another operational scenario for creating and sharing contacts groups between communication participants.

FIG. 5 illustrates operational scenario 500 for creating and sharing contacts groups between communication participants. Operational scenario 500 begins with the completion of operational scenario 400 at step 1 and describes how the contacts group created in operational scenario 400 may be updated. In this example, participant 331 updates at step 2 the participants in the already created and shared contacts group. Other examples may allow for other participants to update the contacts group (e.g., the sharing of the contacts group may also allow those with which the contacts group is shared to edit the contacts group). Participant 331 may provide user input to indicate the updates to user system 301 during the call or after the call has ended (possibly via a different user system in the latter case). Similarly, participant 331 may provide the update via a conference client application, a contacts list application, or some other application. For example, a new participant may join the call and participant 331 may determine that the new participant's contact information should be added to the contacts group or participant 331 may determine that a participant does not belong in the group and should be removed. Other manners of modifying the contacts group may also be performed (e.g., editing a particular item of contact information, such as correcting a wrong phone number).

If additional contact information is needed, such as may be the case with a new participant added to the contacts group, then user system 301 obtains that contact information at step 3 in a manner similar to how the contact information was obtained at step 3 in operational scenario 400. The shared contacts group is then updated with contact information storage system 306 at step 4 to reflect the updates from participant 331. Those updates are then reflected across the contacts lists of all of participant 331, participant 332, participant 333, and participant 334 at step 5. When any of participant 331, participant 332, participant 333, and participant 334 goes to access their respective contacts lists at step 6 via user system 301, user system 302, user system 303, and user system 304, the updated contacts group and the contact information therein will appear.

In some examples, the updates may also update the users to which the contacts group is shared. Users may be removed or added to the users selected for sharing. For example, if a new participant is added to the contacts group at step 2, then participant 331 may also update the sharing settings for the group to instruct contact information storage system 306 to also share the contacts group with the new participant (alternatively, the sharing settings may automatically share to whoever is in the contacts group, which now includes the new participant).

Figure 6:
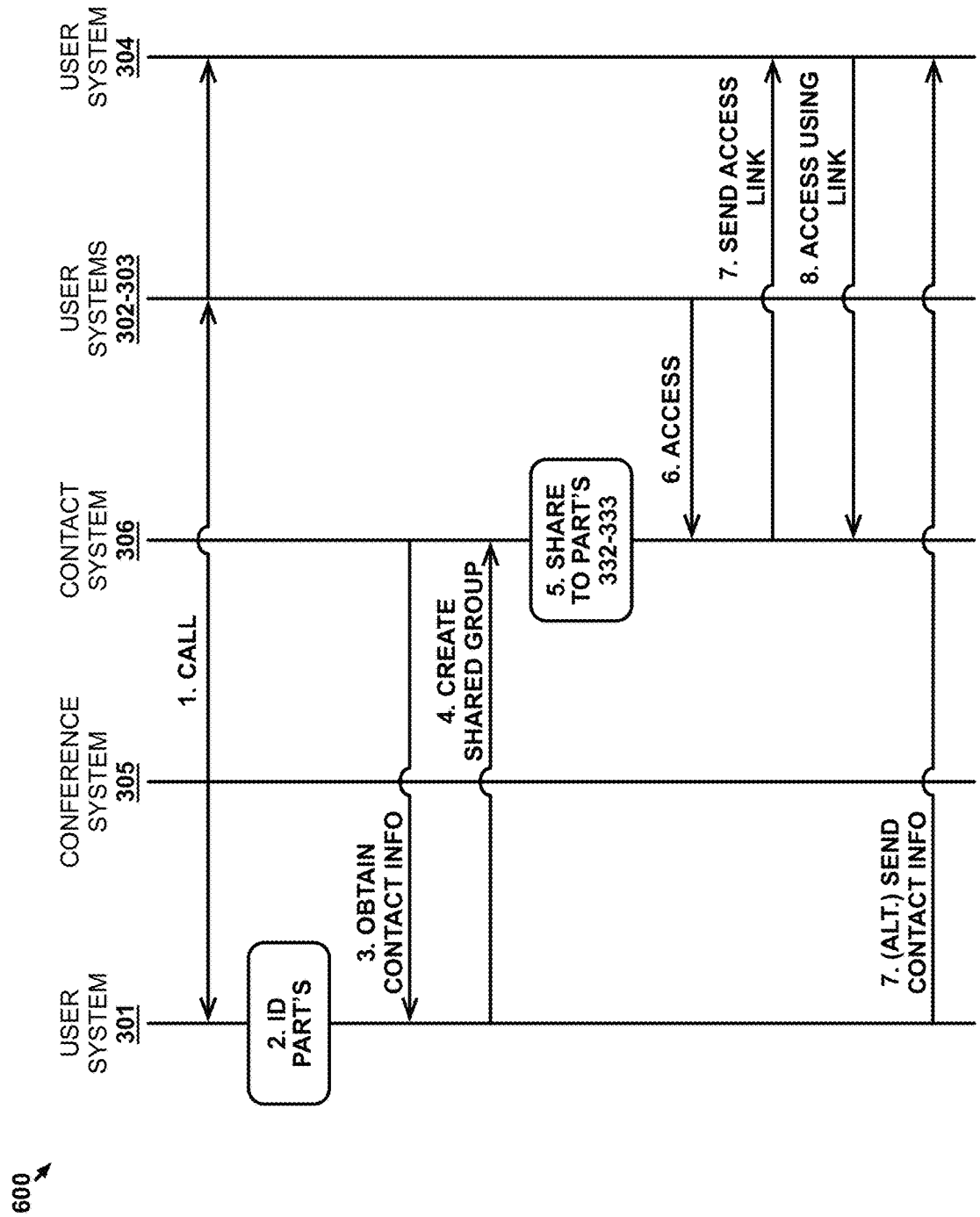
FIG. 6 illustrates another operational scenario for creating and sharing contacts groups between communication participants.

FIG. 6 illustrates operational scenario 600 for creating and sharing contacts groups between communication participants. Operational scenario 600 begins with steps 1-4 tracking steps 1-4 in operational scenario 400. Operational scenario 600 diverges from operational scenario 400 in that only participant 332 and participant 333 have first hand access to the services provided by communication platform 341. Therefore, contact information storage system 306 only shares the created contacts group with participant 332 and participant 333 at step 5, which allows them to access the contacts group in their respective contacts lists at step 6.

While the above steps allow participant 332 and participant 333 to access the contacts group in their respective contacts lists just like they did back in operational scenario 400, participant 334 is not able to likewise do so in this example. Participant 334 does not have a contacts list maintained on contact information storage system 306 because participant 334 does not have access to communication platform 341 other than participating in a communication session initiated by someone who does have access (e.g., participant 331, participant 332, or participant 333 in this example). Participant 334 may use a different contact information storage system to maintain their contacts list or their contacts list may be stored locally on user system 104.

In this example, contact information storage system 306 transfers an access link (e.g., URL) at step 7 to user system 304. The access link may be transferred over short message service (SMS), email, instant messaging over the communication session, instant messaging over another service, or some other communication means available to user system 304 or some other user system associated with participant 334. In one example, the access link may be transferred via email and participant 334 may be able to access their email from any number of user systems (e.g., smartphone, tablet, laptop, etc.) whether through an email application or through a web browser interface. Thus, participant 331 may be able to receive the access link at a user system other than user system 304. In fact, in some cases, user system 304 may not be able to receive the access link (e.g., user system 304 may be a standard telephone without the ability to access email).

In this example, user system 304 is able to receive the access link and follows the access link at step 8 to access the contacts group from contact information storage system 306. The access link may trigger a web browser to open a web interface to the contacts group on contact information storage system 306, may trigger downloading of a file containing the contacts group in a format user system 304 can open, may open a contacts list application on user system 304 to access the contacts group from contact information storage system 306 (e.g., contact information storage system 306 may provide the contacts group in a format understood by the contacts list application), or some other may trigger some other function on user system 304 to remotely access the contacts group from contact information storage system 306.

In an alternative to sending the access link at step 7, user system 301 may itself transfer the contacts group in a format that can be opened by user system 304. For example, user system 301 may transfer the contacts group in a generic CSV format or a common contacts list format that can be opened by user system 304. Like the access link above, the contacts group in this case may be transferred over short message service (SMS), email, instant messaging over the communication session, instant messaging over another service, or some other communication means available to user system 301 and user system 304 or some other user system associated with participant 334. In some examples, contact information storage system 306 may transfer the contacts group rather than user system 301. Similarly, in some examples, contact information storage system 306 may provide user system 301 with the access link so that user system 301 itself can transfer the access link to user system 304.

Figure 7:
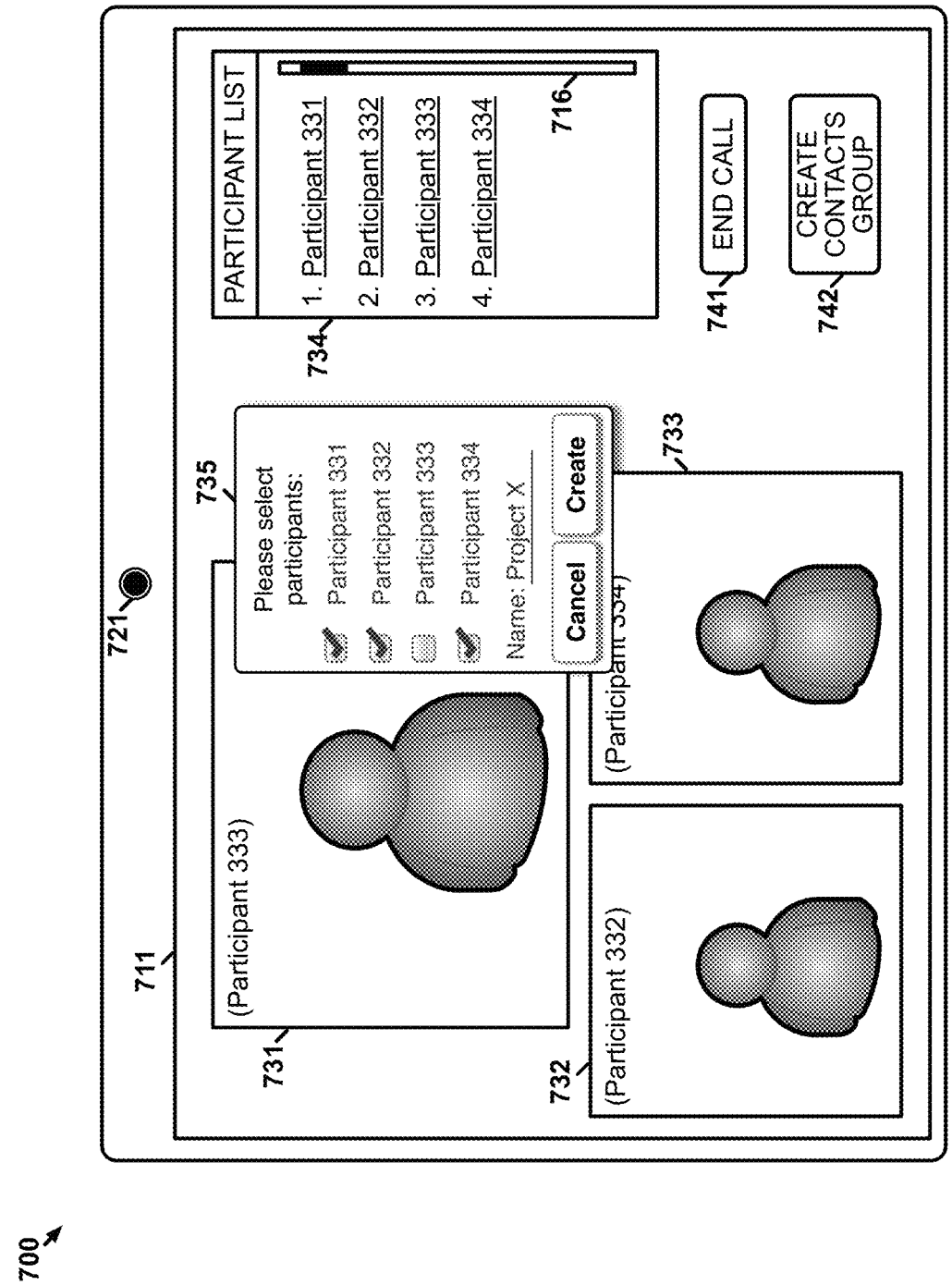
FIG. 7 illustrates a display system for creating and sharing contacts groups between communication participants.

FIG. 7 illustrates display system 700 for creating and sharing contacts groups between communication participants. Display system 700 includes display 711 and camera 721. Display system 700 is an example component of user system 301, which may be a desktop computer workstation, a laptop computer, tablet computer, or some other type of computing system. User system 301 may also be a smaller device, such as a smartphone, but would likely use a different form factor for display system 700. In some examples, camera 721 may be omitted but, in this example, is used to capture video for a video conference call between participant 331, participant 332, participant 333, and participant 334.

Display 711 is displaying a conference client application for participant 331 to participate in the video conference call. As part of the conference client application, display 711 displays participant window 731, participant window 732, participant window 733, participant list window 734, and participant selection window 735. Participant window 731 shows video captured from user system 303 of participant 333, participant window 732 shows video captured from user system 302 of participant 332, and participant window 733 shows video captured from user system 304 of participant 334. Participant list window 734 shows a list of participants currently participating in the video conference call. In this example, the participant list includes participant 331, participant 332, participant 333, and participant 334. Should there be additional participants in other examples, scroll bar 716 may be used to scroll down through additional participants not able to be shown in participant list window 734 otherwise. In some examples, the participants shown in participant list window 734 may be reordered based on who talked most recently, may be highlighted to show who is currently talking, or some other visual cue that participant 331 may find helpful during the video conference call. End call button 741, when selected by participant 331, will at least end the video conference call with user system 301 and, possibly, end the video conference call as a whole. Other options for controlling the video conference call may also be included in other examples, such as a mute button, video off button, document share button, chat window initiation button, or buttons/menu options for other types of features.

In this example, participant 331 selects create contacts group button 742 to instruct user system 301 to create a new contacts group from within the conference client application. To create a contacts group, participant selection window 735 is displayed on display 711 and provides check boxes next to the participants on the video conference call. Other manners of allowing for the selection may also be used, such as selection boxes (e.g., check boxes) appearing next to the respective participants in participant list window 734. In this example, participant 331 selects participant 331, participant 332, and participant 334 for inclusion in the new contacts group. Participant selection window 735 further provides an input field where participant 331 inputs a name for the new contacts group. The name of the contacts group is "Project X" in this case, which may be meant to indicate that those included in the contacts group are those participants that are working on project X.

Upon participant 331 selecting the "create" button in participant selection window 735, a contacts group is created and shared among the selected participants in accordance with the example scenarios discussed above. In other examples, participant selection window 735 or another window may provide participant 331 with the opportunity to select with who the contacts group is shared but, in this example, the contacts group is simply shared with those participants in the contacts group.

Figure 8:
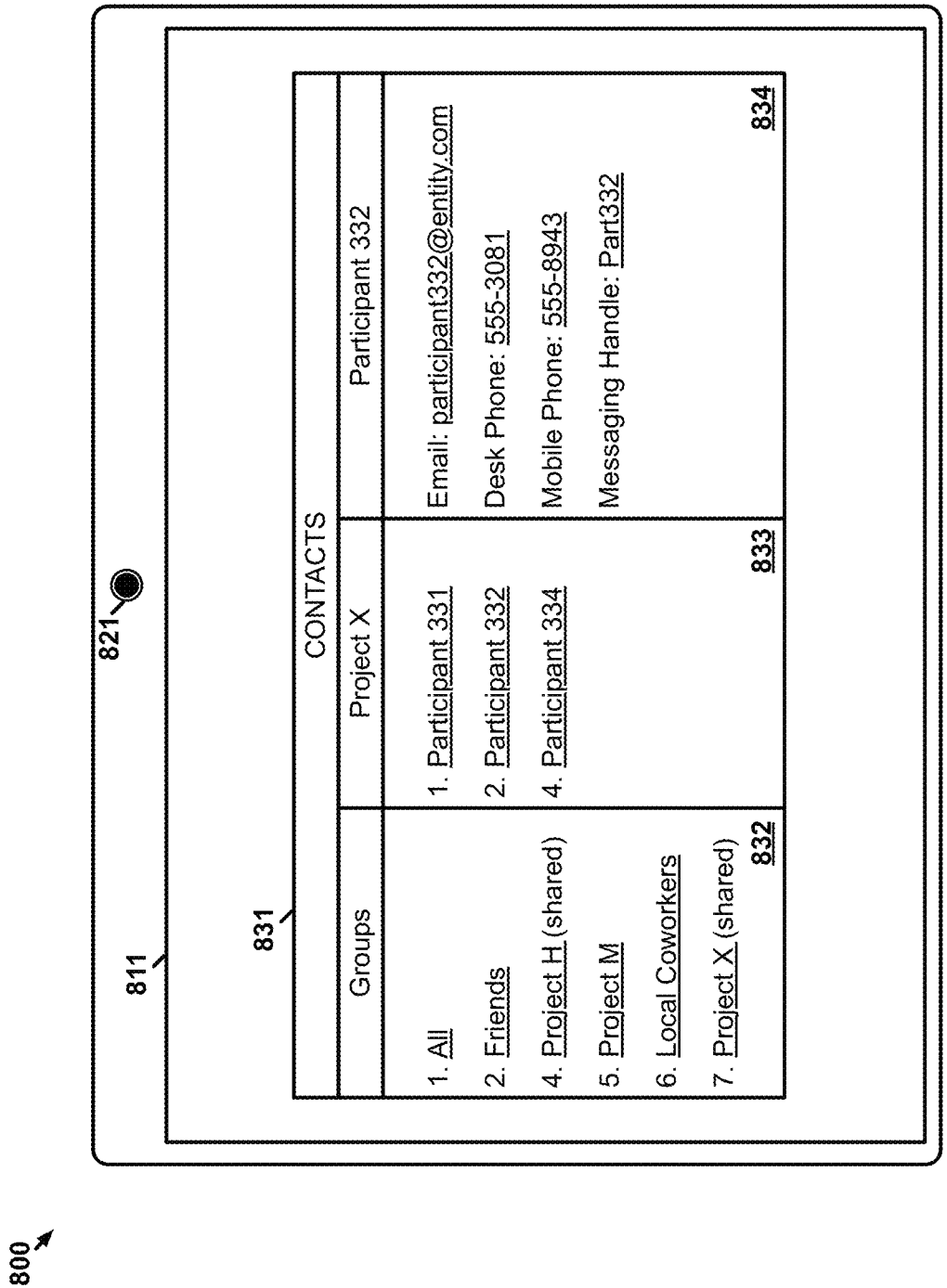
FIG. 8 illustrates a display system for creating and sharing contacts groups between communication participants.

FIG. 8 illustrates display system 800 for creating and sharing contacts groups between communication participants. Display system 800 includes display 811 and camera 821. Display system 800 may be an example of any of user system 301, user system 302, and user system 304 of participant 331, participant 332, and participant 334, respectively, to which the contacts group created from participant selection window 735 is shared. For the purposes of this example, display system 800 will be considered an example of user system 304 for participant 334. User system 304 may be a desktop computer workstation, a laptop computer, tablet computer, or some other type of computing system. User system 304 may also be a smaller device, such as a smartphone, but would likely use a different form factor for display system 800. In some examples, camera 821 may be omitted.

Contacts list application 831 is displayed on display 811 at a time after the contacts group for project X has been shared with participant 334. Contacts list application 831 comprises three window panes within the main window for contacts list application 831, contacts group pane 832, contacts list pane 833, and contacts information pane 834. Contacts group pane 832 presents seven different contacts groups for a contacts list of participant 334 and further notes which contacts lists are shared with others. In this case, a contacts group for project H and the contacts group for project X are both indicated as being shared with others.

Upon participant 334 selecting "Project X" from contacts group pane 832, the people within the project X contacts group are presented in contacts list pane 833. Specifically, contacts list pane 833 shows that the project X contacts group includes contact information for participant 331, participant 332, and participant 334. Upon participant 334 selecting "Participant 332" from contacts list pane 833, contact information for participant 332 is presented in contacts information pane 834. From contacts information pane 834, participant 334 may be able to initiate a communication (e.g., phone call, messaging session, new email message) by selecting on of the items of contact information within. Alternatively, participant 334 may simply reference the contact information for participant 332 in contacts information pane 834 (e.g., to dial one of participant 332's phone numbers into a different device).

If the participants or contact information within the project X contacts group are updated, those updates will be reflected in the project X contacts group in contacts list application 831. Similarly, if the project X contacts group expires or is otherwise removed from being shared with participant 334, then contacts group pane 832 will no longer show "Project X" therein. Likewise, contacts list pane 833 and contacts information pane 834 will not show the contact information for the project X contacts group, although participant 334 may still be able the access the contact information of participant 331, participant 332, and participant 334 from elsewhere in contacts list application 831 (e.g., within the "All" group of contacts group pane 832).

Figure 9:
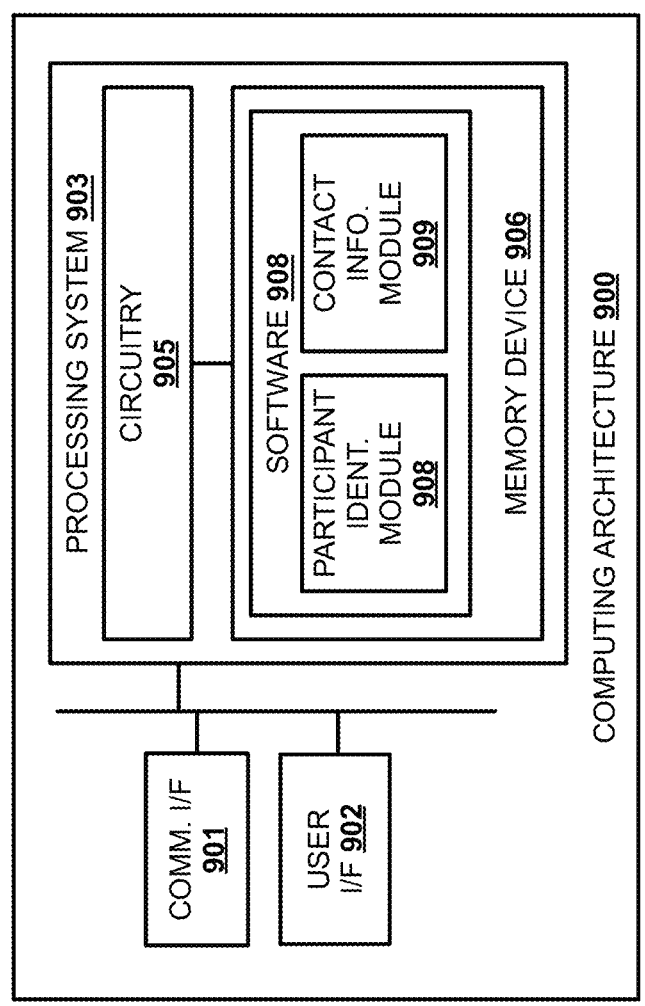
FIG. 9 illustrates a computing architecture for creating and sharing contacts groups between communication participants.

FIG. 9 illustrates computing architecture 900 for creating and sharing contacts groups between communication participants. Computing architecture 900 is an example computing architecture for user systems 101-104 and 301-304, although systems 101-104 and 301-304 may use alternative configurations. A similar architecture may also be used for other systems described herein, although alternative configurations may also be used. Computing architecture 900 comprises communication interface 901, user interface 902, and processing system 903. Processing system 903 is linked to communication interface 901 and user interface 902. Processing system 903 includes processing circuitry 905 and memory device 906 that stores operating software 907.

Communication interface 901 comprises components that communicate over communication links, such as network cards, ports, RF transceivers, processing circuitry and software, or some other communication devices. Communication interface 901 may be configured to communicate over metallic, wireless, or optical links. Communication interface 901 may be configured to use TDM, IP, Ethernet, optical networking, wireless protocols, communication signaling, or some other communication format—including combinations thereof.

User interface 902 comprises components that interact with a user. User interface 902 may include a keyboard, display screen, mouse, touch pad, or some other user input/output apparatus. User interface 902 may be omitted in some examples.

Processing circuitry 905 comprises microprocessor and other circuitry that retrieves and executes operating software 907 from memory device 906. Memory device 906 comprises a computer readable storage medium, such as a disk drive, flash drive, data storage circuitry, or some other memory apparatus. In no examples would the computer readable storage medium of memory device 906 be considered a propagated signal. Operating software 907 comprises computer programs, firmware, or some other form of machine-readable processing instructions. Operating software 907 includes participant identification module 908 and contact information module 909. Operating software 907 may further include an operating system, utilities, drivers, network interfaces, applications, or some other type of software. When executed by processing circuitry 905, operating software 907 directs processing system 903 to operate computing architecture 900 as described herein.

In particular, participant identification module 908 directs processing system 903 to identify participants participating in a communication session and receive first user input from a first participant of the participants, wherein the first user input identifies a first selection of the participants comprising at least one of the participants. Contact information module 909 directs processing system 903 to obtain first contact information for the first selection of the participants, include the first contact information in the first contacts group, and provide the first contacts group to a selection of one or more users.

The descriptions and figures included herein depict specific implementations of the claimed invention(s). For the purpose of teaching inventive principles, some conventional aspects have been simplified or omitted. In addition, some variations from these implementations may be appreciated that fall within the scope of the invention. It may also be appreciated that the features described above can be combined in various ways to form multiple implementations. As a result, the invention is not limited to the specific implementations described above, but only by the claims and their equivalents.

What is claimed is:

1. A method for sharing contacts groups, the method comprising:
   identifying participants participating in a communication session between user systems, wherein a first user system of the user systems executes a conference client application for the communication session that presents a participant list to a first participant of the participants, wherein the participant list identifies the participants to the first participant;
   receiving first user input from the first participant via the conference client application, wherein the first user input identifies a first selection of the participants comprising at least one of the participants;
   obtaining first contact information for the first selection of the participants;
   instructing a contact information storage system to create a first contacts group that includes the first contact information, wherein the contact information storage system stores respective contacts lists of one or more users selected for sharing of the first contacts group; and
   instructing the contact information storage system to share the first contacts group to the contacts lists, wherein the first contact information is accessible to the one or more users when selecting the first contacts group in the contacts lists from the contact information storage system.

2. The method of claim 1, further comprising:
   after providing the first contacts group, receiving second user input, wherein the second user input identifies a second selection of the participants comprising at least one of the participants not already included in the first contacts group;
   obtaining second contact information for the second selection of the participants; and
   updating the first contacts group with the second contact information.

3. The method of claim 1, wherein the first user input identifies the first selection of the participants from the participant list.

4. The method of claim 1, wherein receiving the first user input comprises:
   receiving one or more criterion for including a participant in the first contacts group; and
   determining that each participant of the first selection of the participants satisfies the one or more criterion.

5. The method of claim 1, wherein obtaining the first contact information comprises:
   identifying one or more work related items of contact information from a set that includes non-work related items of contact information.

6. The method of claim 1, further comprising:
receiving second user input, wherein the second user input indicates one or more criterion for when first contacts group will expire; and
including the one or more criterion when providing the first contacts group.

7. The method of claim 6, wherein, upon satisfaction of the one or more criterion, the first contacts group is removed from a contacts list for each respective user of the selection of one or more users.

8. The method of claim 1, wherein the first contacts group is selected from a plurality of contacts groups in the contacts lists.

9. The method of claim 1, wherein the contact information storage system provides a link to access the first contacts group to respective users of the one or more users that do not have a contacts list in the contact information storage system.

10. An apparatus for sharing contacts groups, the apparatus comprising:
one or more computer readable storage media;
a processing system operatively coupled with the one or more computer readable storage media; and
program instructions stored on the one or more computer readable storage media that, when read and executed by the processing system, direct the processing system to:
identify participants participating in a communication session between user systems, wherein a first user system of the user systems executes a conference client application for the communication session that presents a participant list to a first participant of the participants, wherein the participant list identifies the participants to the first participant;
receive first user input from the first participant via the conference client application, wherein the first user input identifies a first selection of the participants comprising at least one of the participants;
obtain first contact information for the first selection of the participants;
instruct a contact information storage system to create a first contacts group that includes the first contact information, wherein the contact information storage system stores respective contacts lists of one or more users selected for sharing of the first contacts group; and
instruct the contact information storage system to share the first contacts group to the contacts lists, wherein the first contact information is accessible to the one or more users when selecting the first contacts group in the contacts lists from the contact information storage system.

11. The apparatus of claim 10, wherein the program instructions further direct the processing system to:
receive second user input after the first contacts group is provided, wherein the second user input identifies a second selection of the participants comprising at least one of the participants not already included in the first contacts group;
obtain second contact information for the second selection of the participants; and
update the first contacts group with the second contact information.

12. The apparatus of claim 10, wherein the first user input identifies the first selection of the participants from the participant list.

13. The apparatus of claim 10, wherein to receive the first user input, the program instructions direct the processing system to:
receive one or more criterion for including a participant in the first contacts group; and
determine that each participant of the first selection of the participants satisfies the one or more criterion.

14. The apparatus of claim 10, wherein to obtain the first contact information, the program instructions direct the processing system to:
identify one or more work related items of contact information from a set that includes non-work related items of contact information.

15. The apparatus of claim 10, wherein the program instructions further direct the processing system to:
receive second user input, wherein the second user input indicates one or more criterion for when first contacts group will expire; and
include the one or more criterion when providing the first contacts group.

16. The apparatus of claim 15, wherein, upon satisfaction of the one or more criterion, the first contacts group is removed from a contacts list for each respective user of the selection of one or more users.

17. The apparatus of claim 10, wherein the first contacts group is selected from a plurality of contacts groups in the contacts lists.

18. The apparatus of claim 10, wherein the contact information storage system provides a link to access the first contacts group to respective users of the one or more users that do not have a contacts list in the contact information storage system.

19. One or more computer readable storage media having program instructions stored thereon for sharing contacts groups, the program instructions, when executed by a processing system, direct the processing system to:
identify participants participating in a communication session between user systems, wherein a first user system of the user systems executes a conference client application for the communication session that presents a participant list to a first participant of the participants, wherein the participant list identifies the participants to the first participant;
receive first user input from the first participant via the conference client application, wherein the first user input identifies a first selection of the participants comprising at least one of the participants;
obtain first contact information for the first selection of the participants;
instruct a contact information storage system to create a first contacts group that includes the first contact information, wherein the contact information storage system stores respective contacts lists of one or more users selected for sharing of the first contacts group; and
instruct the contact information storage system to share the first contacts group to the contacts lists, wherein the first contact information is accessible to the one or more users when selecting the first contacts group in the contacts lists from the contact information storage system.

20. The one or more computer readable storage media of claim 19, wherein the program instructions further direct the processing system to:
- receive second user input, wherein the second user input indicates one or more criterion for when first contacts group will expire; and
- include the one or more criterion when providing the first contacts group.

* * * * *